US007013567B2

(12) United States Patent
Myers (10) Patent No.: US 7,013,567 B2
(45) Date of Patent: Mar. 21, 2006

(54) HAND HELD PIPE CUTTERS

(76) Inventor: Kent J. Myers, 9090 Stallion Rd., Magnolia, OH (US) 44643

( * ) Notice: Subject to any disclaimer, the term of this patent is extended or adjusted under 35 U.S.C. 154(b) by 0 days.

(21) Appl. No.: 10/692,487

(22) Filed: Oct. 27, 2003

(65) Prior Publication Data

US 2005/0086809 A1    Apr. 28, 2005

(51) Int. Cl.
*B23D 21/00* (2006.01)
(52) U.S. Cl. .......................... 30/101; 30/102; 81/182; 82/70.2; 82/83
(58) Field of Classification Search ............. 30/93–97, 30/101–103; 82/70.2, 72, 84, 83, 113; 83/603; 81/182
See application file for complete search history.

(56) References Cited

U.S. PATENT DOCUMENTS

| 4,305,205 A | * | 12/1981 | Girala | 30/102 |
|---|---|---|---|---|
| 4,438,562 A | * | 3/1984 | Courty | 30/99 |
| 4,769,911 A | * | 9/1988 | Araki | 30/94 |
| 4,802,278 A | * | 2/1989 | Vanderpol et al. | 30/97 |
| 4,831,732 A | * | 5/1989 | Garton | 30/101 |
| 4,890,385 A | * | 1/1990 | VanderPol et al. | 30/101 |
| 5,088,196 A | | 2/1992 | Fukuda | |
| 5,829,142 A | | 11/1998 | Rieser | |
| 5,836,079 A | * | 11/1998 | Cronin et al. | 30/101 |
| 6,065,212 A | * | 5/2000 | Lazarevic | 30/101 |
| 6,095,021 A | * | 8/2000 | Epperson | 82/70.2 |
| 6,134,997 A | | 10/2000 | Rosanova | |
| 6,202,307 B1 | * | 3/2001 | Wrate | 30/101 |
| 6,637,115 B1 | * | 10/2003 | Walsh et al. | 30/94 |
| 6,739,055 B1 | * | 5/2004 | Lee | 30/98 |

* cited by examiner

*Primary Examiner*—Kenneth E. Peterson
*Assistant Examiner*—Phong Nguyen
(74) *Attorney, Agent, or Firm*—Renner, Kenner, Greive, Bobak, Taylor & Weber (57) ABSTRACT

A pipe cutter comprises a rotary head having an axis of rotation, and a housing gear is coaxial with the rotary head such that the housing gear and rotary head have a common axis of rotation. A pipe slot extends into the rotary head and the housing gear, and a pipe cradle is provided in the pipe slot, and serves to receive a pipe. A cutting wheel is associated with the rotary head and a wheel biasing member urges the cutting wheel to extend into the pipe slot. A primary drive source is operatively connected to the housing gear by a gear system that rotates the housing gear and the rotary head about the common axis of rotation. Because the cutting wheel is biased to extend into the pipe slot and contacts a pipe placed therein, the cutting wheel revolves around the pipe and cuts into the pipe during rotation of the rotary head. The primary drive source may be manual or automated.

9 Claims, 14 Drawing Sheets

HAND HELD PIPE CUTTERS

BACKGROUND OF THE INVENTION

The present invention generally relates to pipe cutters. More particularly, this invention relates to a portable pipe cutter that cuts a pipe by revolving a cutting blade around the circumference of the pipe. Because the cutting blade revolves around the pipe, as opposed to having the pipe rotate against a stationary cutting blade, this pipe cutter may be employed in confined spaces and on stationary pipes.

TECHNICAL FIELD

Hand held pipe cutters that operate by causing a cutting blade to revolve around the pipe have been provided in the prior art. In the earliest pipe cutters, a cutting blade and associated rollers provide a cradle for the pipe, and the position of the cutting blade relative to the rollers is adjustable to accommodate pipes having various diameters. Once the pipe is clamped between the cutting blade and rollers, the pipe may be cut by revolving the cutting wheel around the pipe. Typically, the pipe is held in one hand while the cutter is held in the other and manipulated to rotate about the pipe. During the cutting operation, the distance between the cutting blade and the rollers is incrementally decreased to thereby incrementally increase the depth to which the cutting wheel penetrates the pipe clamped therebetween. Because these pipe cutting devices must be manually rotated about the pipe, their use is significantly limited in confined spaces. Additionally, cutting piping, tubing, or similar work pieces with these conventional pipe cutters is a tedious, hands-on task.

More recently, hand held pipe cutters have been provided having a rotatable body with a C-shaped opening that receives the pipe to be cut. The C-shaped opening typically includes support rollers that contact the pipe and an opposed cutting blade, such that a pipe placed in the opening is clamped between the cutting blade and the rollers. As the rotatable body is caused to rotate, the rollers and cutting blade revolve around the circumference of the pipe, and the distance between the cutting blade and the rollers is either incrementally or continuously decreased such that the cutting blade eventually cuts through the pipe.

Although the prior art has proposed various embodiments of such pipe cutters, it is believed that none of these embodiments have been widely accepted in the fields in which they might be employed. Notably, many of these pipe cutters are complex in design and very expensive to manufacture. Additionally, it is believed that the gearing systems in many of these pipe cutters require impractical amounts of power. In many of the prior art pipe cutters, either the rollers or the cutting blade are motor-driven to either incrementally or continuously advance the cutting blade into the pipe. The provision of motor-driven cutting blades or rollers requires additional complicated gear systems and results in a pipe cutter that consumes an unnecessary amount of power.

DISCLOSURE OF THE INVENTION

In general, the present invention provides a pipe cutter including a rotary head having an axis of rotation. A housing gear is coaxial with the rotary head, such that the housing gear and the rotary head have a common axis of rotation. A pipe slot extends into the rotary head and the housing gear. A pipe cradle is provided on the pipe slot for receiving a pipe. A cutting wheel is associated with the rotary head, and a wheel biasing member urges the cutting wheel to extend into the pipe slot.

In one embodiment of the invention, at least two support rollers extend into the pipe slot, and are opposed to the cutting wheel such that a pipe may be cradled between contact points with the rollers and the cutting wheel (i.e., the rollers and cutting wheel provide the "pipe cradle."). In another embodiment, support rollers are not employed and a pipe placed in the pipe slot is cradled by contact with the cutting wheel and an opposed fixed or moveable wall of the pipe slot. In either embodiment, a primary drive source is operatively connected to the housing gear by a gear system that rotates the housing gear and the rotary head about their common axis of rotation. Because the cutting wheel is biased to extend into the pipe slot and contact the pipe, the cutting wheel revolves around the pipe and cuts into the pipe during rotation of the rotary head.

In another embodiment, the present invention provides a pipe cutter that includes a rotary head having an axis of rotation. A housing gear is coaxial with the rotary head, such that the housing gear and the rotary head have a common axis of rotation. A pipe slot extends into the rotary head and the housing gear, and a pipe cradle is provided within the pipe slot for receiving a pipe. A cutting wheel is associated with the rotary head, and a slot-engaging gear is keyed to the housing gear and sized such that one rotation of the slot-engaging gear results in one rotation of the housing gear. The slot-engaging gear includes a protrusion that engages a portion of the pipe slot once during each rotation of the slot-engaging gear and housing gear.

The present invention additionally provides a pipe cutter system that includes a primary drive source, a gear system operatively connected to the primary drive source so as to be driven by the primary drive source, and a plurality of rotary heads selectively individually engaged with said gear system. In this embodiment, each of the plurality of rotary heads include a housing gear, a pipe slot, a pipe cradle within the pipe slot for receiving a pipe, and a cutting wheel extending into the pipe slot. Each pipe cradle of each of the plurality of rotary heads is sized to receive a pipe of a different diameter.

PREFERRED EMBODIMENT FOR CARRYING OUT THE INVENTION

Two particular pipe cutter embodiments are disclosed herein. Each includes a freewheeling cutting wheel that is biased to extend into a pipe slot provided in a rotary head. Each also includes a gear system that drives the rotary head about its axis of rotation. The pipe slot allows the rotary head to be fitted over a pipe, and a pipe cradle is provided in the pipe slot to provide an area where the pipe can be suitably secured to be cut. When a pipe rests within the pipe cradle a manual or automated primary drive source is activated to drive the gear system, and the gear system, in turn, drives the housing gear and associated rotary head to rotate about the pipe. Because the cutting wheel extends into the pipe slot and forms a portion of the pipe cradle, the cutting blade revolves around the pipe, quickly cutting through it due to the biasing force on the cutting wheel.

Various elements of the two pictured pipe cutters differ across the embodiments, and it will be appreciated that certain elements of the embodiments are interchangeable, if appropriate design corrections are made. For instance, the drive gear systems are interchangeable between the two embodiments. Similarly, rollers may or may not be used in either embodiment if appropriate design changes are made for their presence or absence. Alternative designs will be appreciated by those of skill in the art, and the claims will serve to define this invention.

A first embodiment of a pipe cutter is disclosed with reference to FIGS. 1–4, and is represented generally by the numeral 10. Pipe cutter 10 includes rotary head 12, and housing gear 14 formed on its outside edge to be coaxial with the axis of rotation of rotary head 12. In this embodiment, housing gear 14 is formed directly into the outside surface of rotary head 12, but, as will be seen in the second particular embodiment disclosed below, housing gear 14 maybe provided as a separate gear element that is fixed to rotary head 12. Rotary head 12 is formed from mated male and female portions 16 and 18 that, when joined, provide opposed sidewalls 20 and 22. Circumferential wall 24 of the female portion 16 extends beyond sidewalls 20, 22 and form coaxial flanges 26, 28 when male and female portions 16, 18 are joined. Coaxial flanges 26, 28 fit within guides 30, 32 provided in housing members 34, 36. Housing members 34, 36 thus retain rotary head 12 and allow it to be rotated within guides 30, 32.

Figure 1:
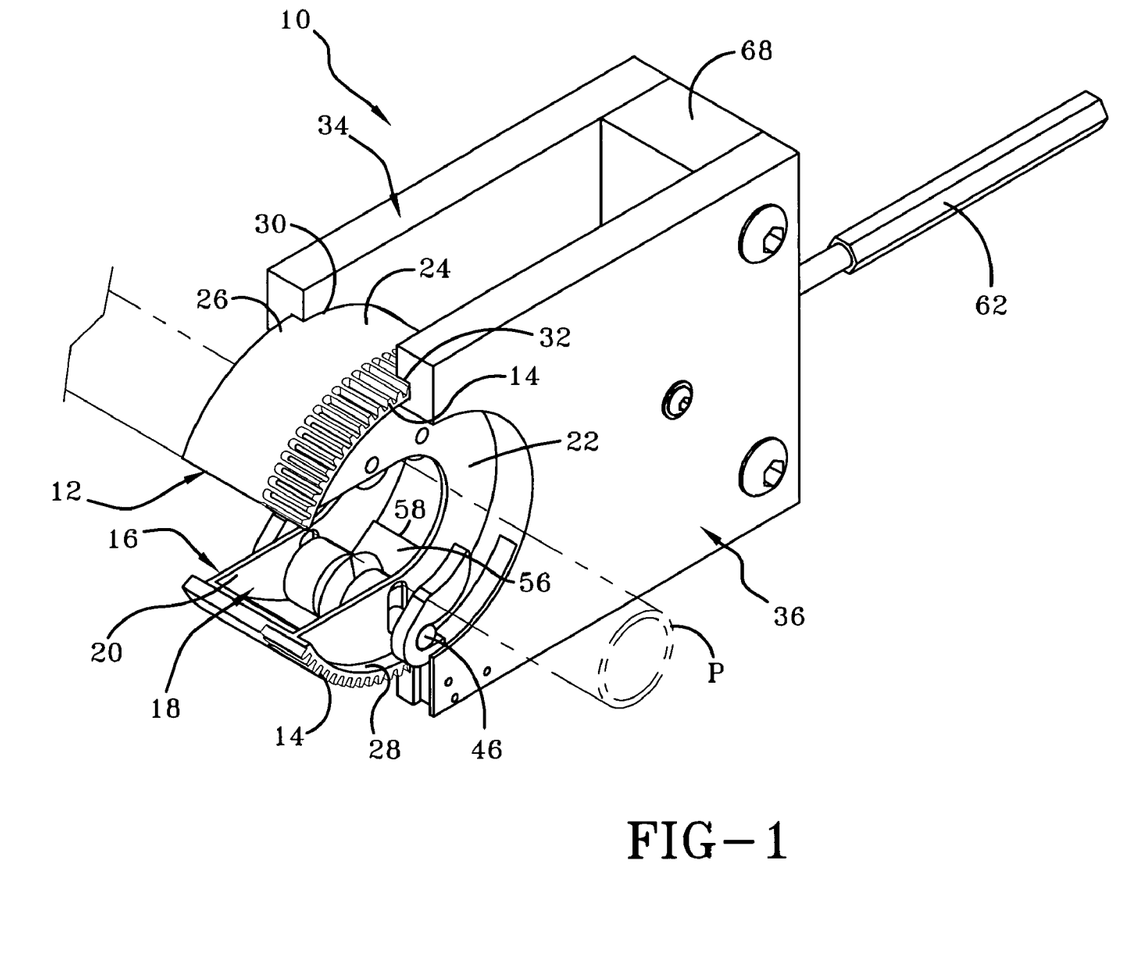
FIG. 1 is a perspective view of the a first embodiment of a pipe cutter according to this invention.
Figure 2:
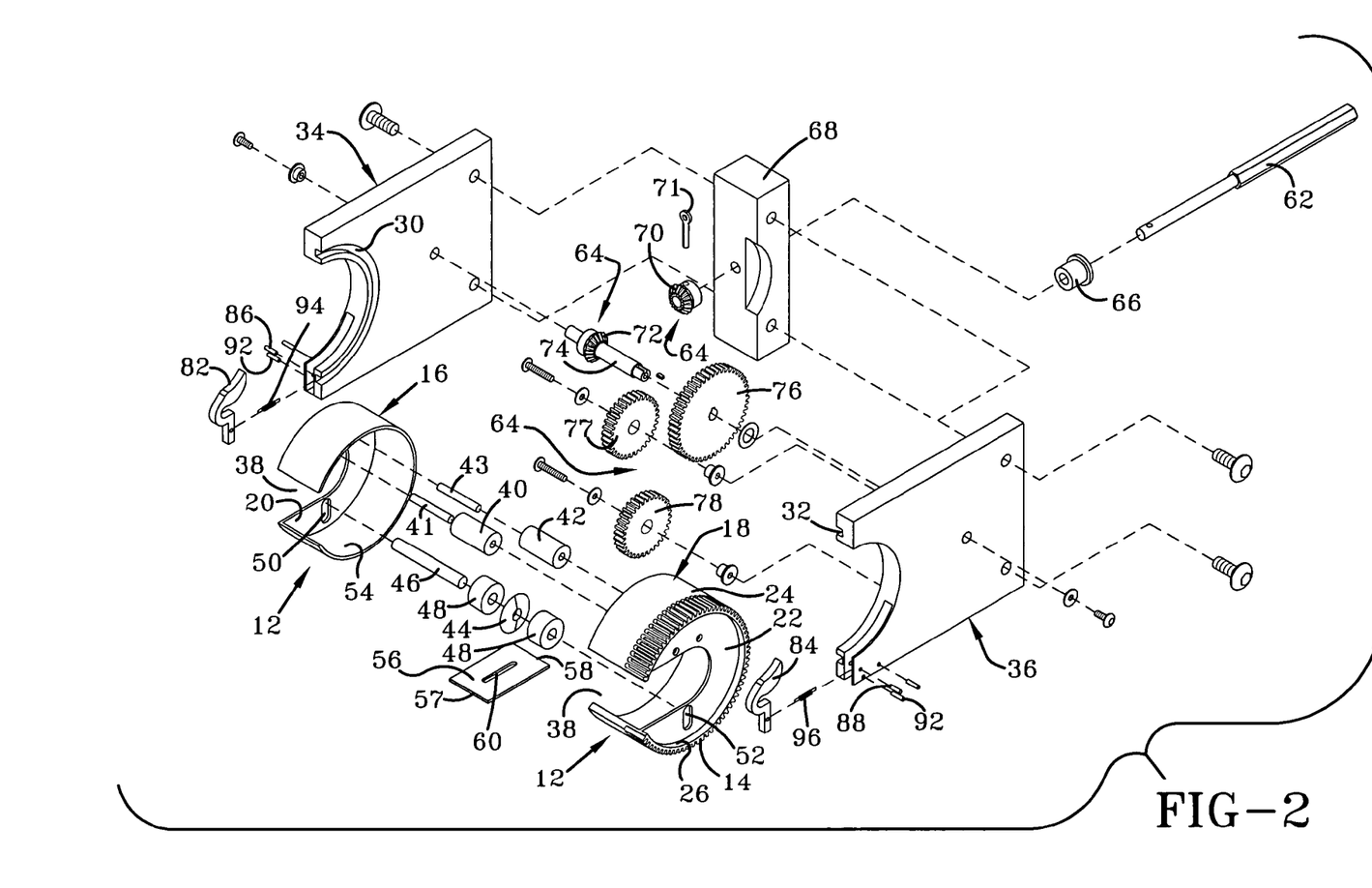
FIG. 2 is an assembly diagram of the first embodiment.
Figure 3:
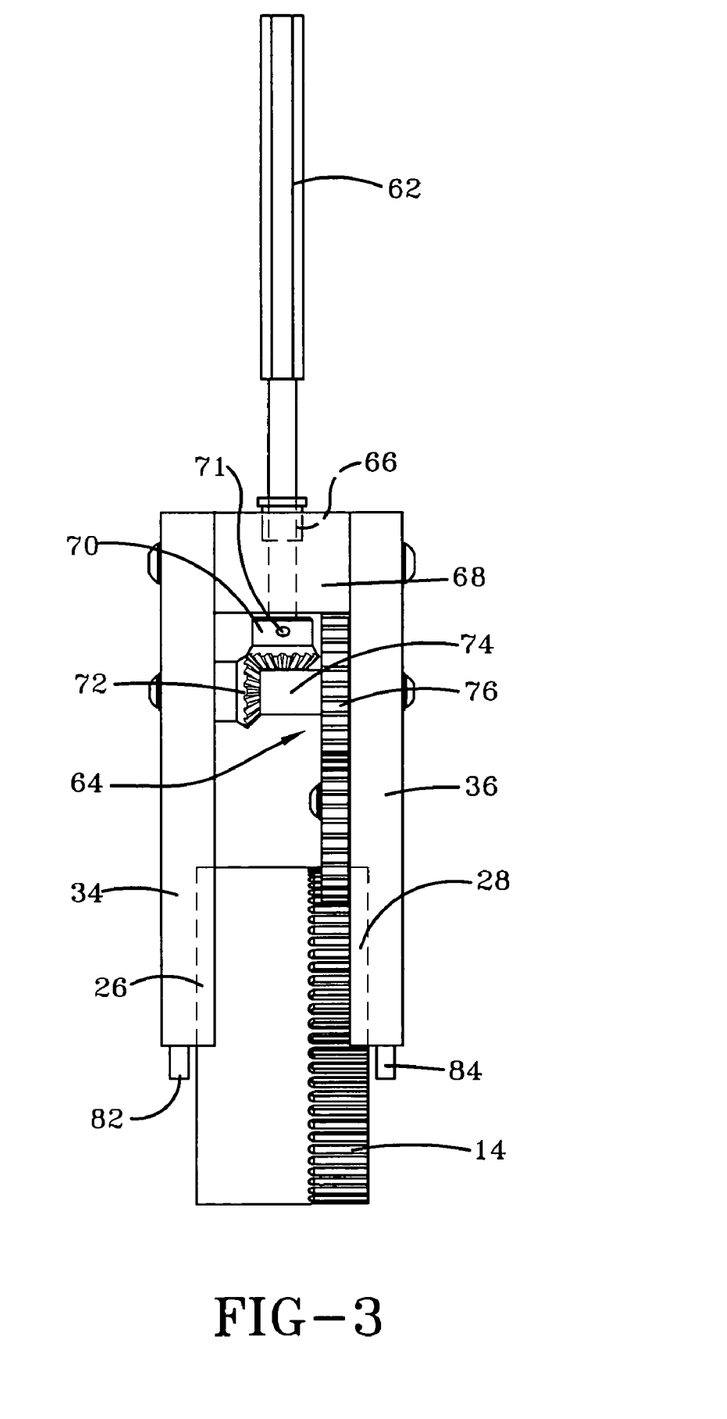
FIG. 3 is a top plan view thereof.

Pipe slot 38 extends into rotary head 12 and housing gear 14 so that rotary head 12 and housing gear 14 can be fitted around a pipe. Freewheeling support rollers 40, 42 ride on shafts 41, 43 that extend between opposed sidewalls 20, 22. Support rollers 40, 42 partially extend into pipe slot 38, and, together with cutting wheel 44, provide a pipe cradle where a pipe can be suitably secured to be cut.

Cutting wheel 44 is fixed to freewheeling shaft 46 and resides between hubs 48. Shaft 46 extends outside of substantially radially extending wheel slots 50, 52 provided in sidewalls 20, 22, respectively. Rotary head 12, particularly male portion 16, provides a cylindrical internal wall 54, and plate spring member 56 contacts the cylindrical internal wall 54 at opposed edges 57, 58, while at the same time receiving a portion of cutting wheel 44 through slot 60. Plate spring 56 pushes against hubs 48 to urge freewheeling shaft 46 radially inwardly in wheel slots 50, 52, thereby urging a portion of cutting wheel 44 to extend into pipe slot 38. Notably, if freewheeling shaft 46 is urged radially outwardly in wheel slots 50, 52, plate spring member 56 will bow radially outwardly while still providing a biasing force on hubs 48 in a radially inwardly direction. It is this biasing force that presses cutting wheel 44 against a pipe once a pipe is placed in the pipe cradle formed by support rollers 40, 42 and cutting wheel 44. Rotary head 12, through housing gear 14, is caused to rotate such that cutting wheel 44 revolves around the pipe, and the biasing force placed on cutting wheel 44 causes cutting wheel 44 to gradually cut into and through the pipe. This will be explained more fully with reference to FIGS. 4A–H.

It will be appreciated that the pipe itself will interfere with the rotation of rotary head 12, if the pipe's longitudinal axis is not coaxial with the axis of rotation of rotary head 12. Thus, steps should be taken to ensure that the pipe cradle formed by support rollers 40, 42 and cutting wheel 44 holds the pipe within pipe slot 38 coaxially with rotary head 12. This may be accomplished in different ways. For instance, in the embodiment shown in FIGS. 1–4, pipe slot 38, support rollers 40, 42, and cutting wheel 44 are configured to receive a pipe of a given size, such that pipes of that size are cradled in pipe slot 38 with their longitudinal axis being substantially coaxial with the axis of rotation of rotary head 12. In such an embodiment, multiple pipe cutters 10 would be provided to cut pipes of different sizes, with each rotary head 12 of each pipe cutter 10 being designed to accommodate a pipe of a particular size. Alternatively, as will be seen in the second embodiment of FIGS. 5–11, a portion of the wall of pipe slot 38 that is opposed to cutting wheel 44 may be made movable to extend into pipe slot 38 to differing degrees. For larger pipes, a wall may be moved out to provide the widest pipe slot possible, while, for pipes of smaller diameters, the wall may be moved inwardly to cradle the smaller pipe between the wall and the cutting wheel and maintain the pipe's longitudinal axis substantially coaxial with rotary head 12. The movable wall portion could include rollers 40, 42, or could be shaped to accommodate the pipe. This will be better appreciated after disclosure of the embodiment of FIGS. 5–11.

In order to rotate rotary head 12 about its axis of rotation, drive shaft 62 is operatively connected to housing gear 14 though a gear system that is generally designated by the numeral 64. Drive shaft 62 extends though bushing 66 and housing member 68, and is secured to beveled gear 70 by pin 71. Beveled gear 70 is keyed to beveled gear 72, which extends from shaft 74 secured between housing members 34, 36 by appropriate fasteners. Prime gear 76 is secured to shaft 74 to rotate therewith, and is keyed to first drive gear 77 and second drive gear 78, which are secured to housing member 36 by appropriate fasteners. First and second drive gears 77, 78 are keyed to housing gear 14. Thus, when drive shaft 62 is rotated by a manual or automated drive source, gear system 64 drives rotary head 12 to rotate within guides 30, 32. Because first drive gear 77 and second drive gear 78 both contact housing gear 14, rotary head 12 may be driven despite the gap in housing gear 14 that is created by pipe slot 38.

To disclose how a pipe is fit into pipe slot 38 and to further disclose how a pipe is cut by operation of pipe cutter 10, reference is made to FIGS. 2 and 4A–H. Therein, a side view of relevant portions of pipe cutter 10 is shown, with portions behind housing member 36 being shown in phantom. It can be seen that housing member 36 includes a circumferential recess 80 (as does member 34) so that rotary head 12 may rotate despite the fact that the freewheeling shaft 46 for cutting wheel 44 extends outwardly of sidewalls 20, 22.

Figure 4A:
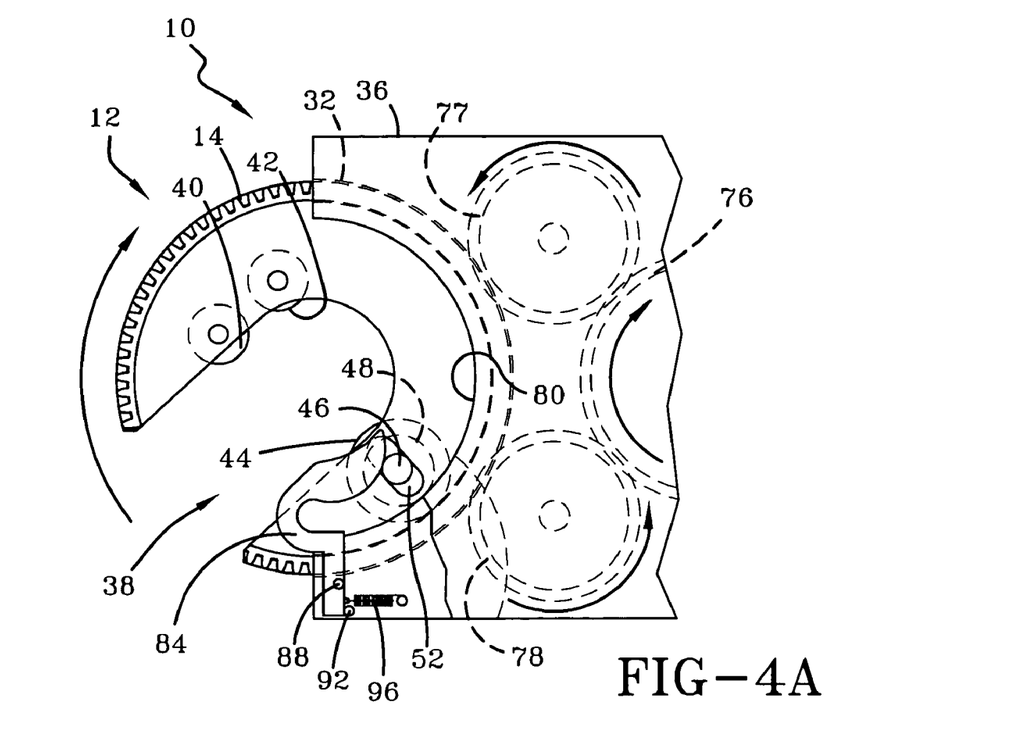
FIGS. 4A through 4G are side plan elevational views of the first embodiment of a pipe cutter, and demonstrate the operation thereof.
Figure 4B:
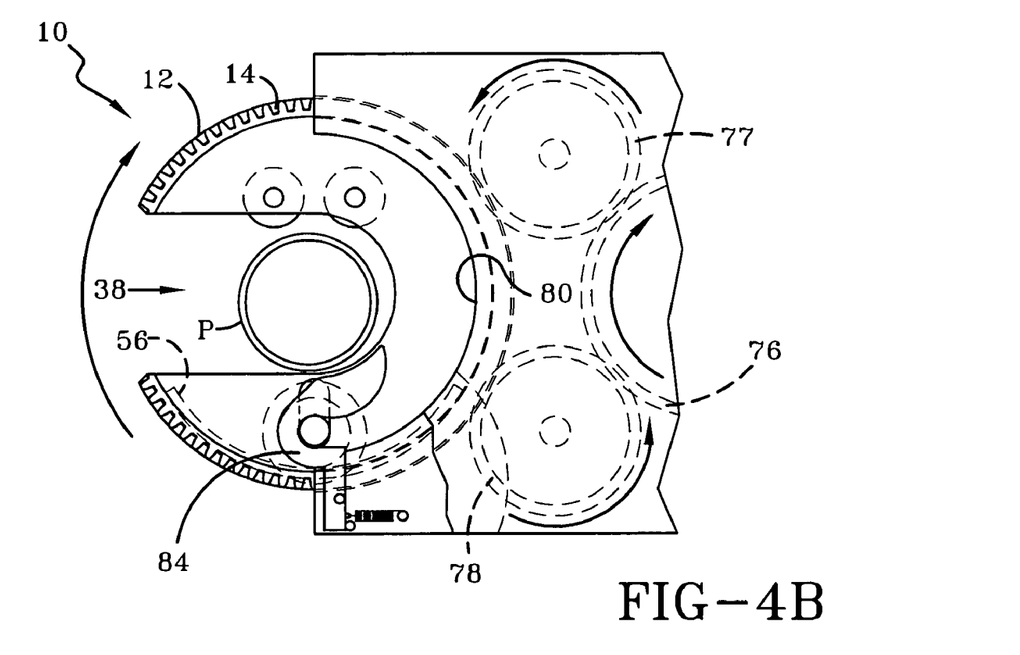

Opposed hooks 82, 84 are fixed to housing members 34, 36, respectively, by associated pivot pins 86, 88, and serve to engage freewheeling shaft 46 when rotary head 12 is rotated in the clockwise direction (in the orientation shown in FIGS. 4A–H). In FIGS. 4A and B it can be seen that rotary head 12 may be rotated in the clockwise direction so that hooks 82, 84 engage freewheeling shaft 46, causing shaft 46 to be pulled radially outwardly in wheel slots 50, 52. Hooks 82, 84 thus withdraw cutting wheel 44 from pipe slot 38, and adequate room is thereby provided for receiving a pipe P in pipe slot 38. Stop pins 90, 92 prevent hooks 82, 84 from pivoting about pivot pins 86, 88 beyond the position shown in FIG. 4B.

Figure 4C:
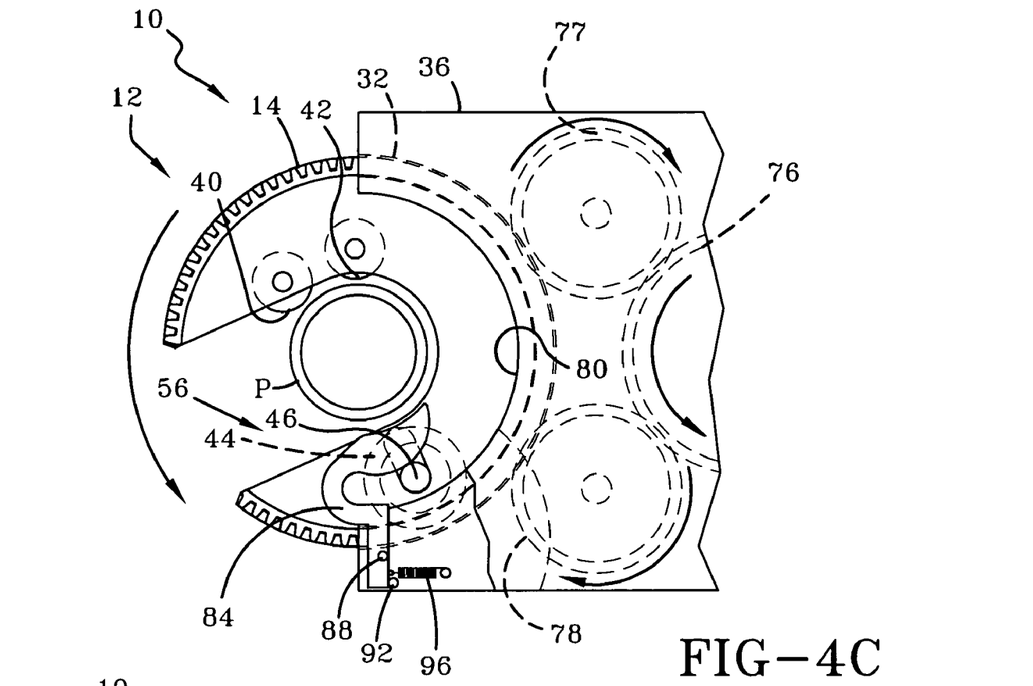
Figure 4D:
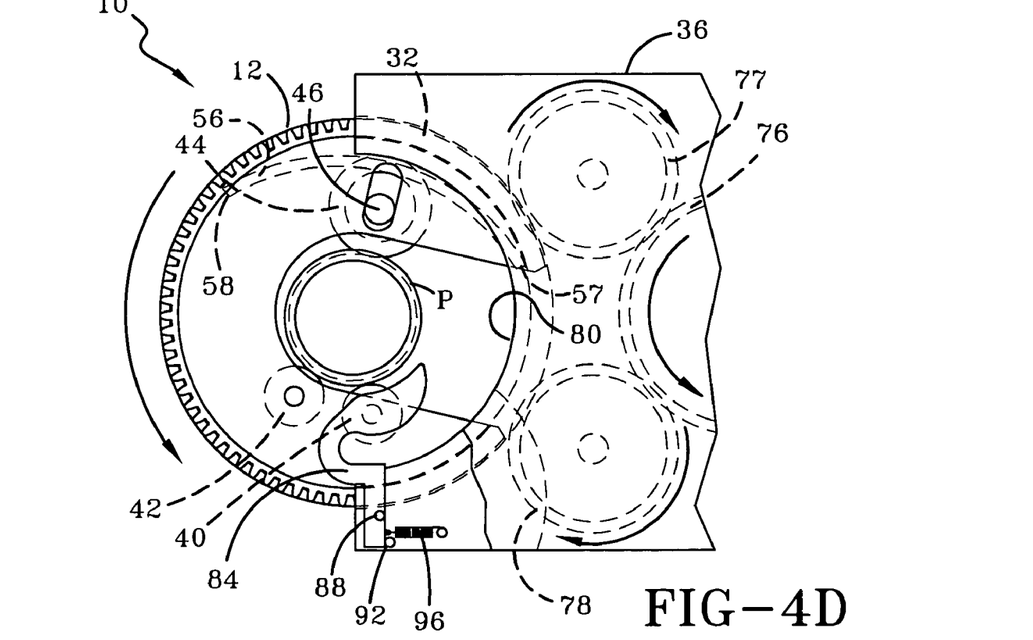
Figure 4E:
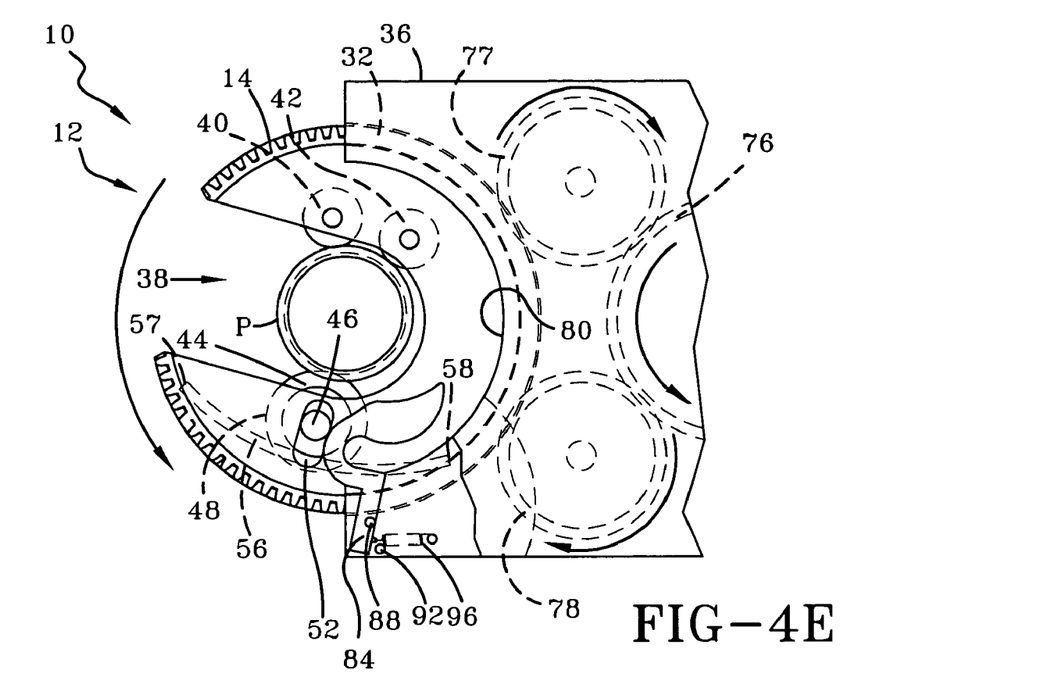
Figure 4F:
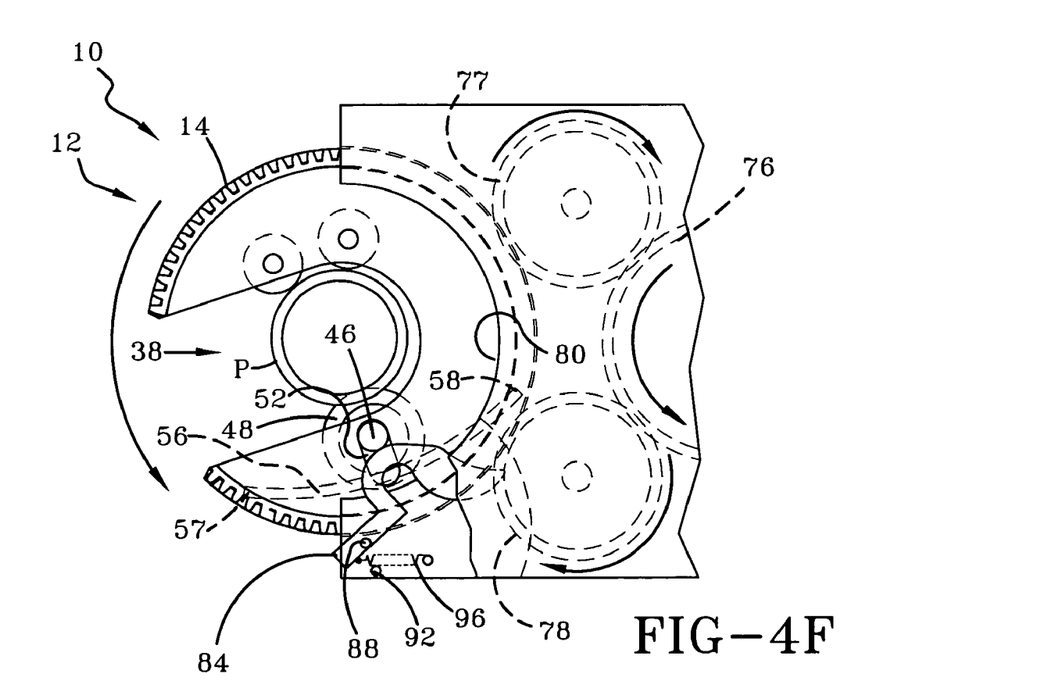
Figure 4G:
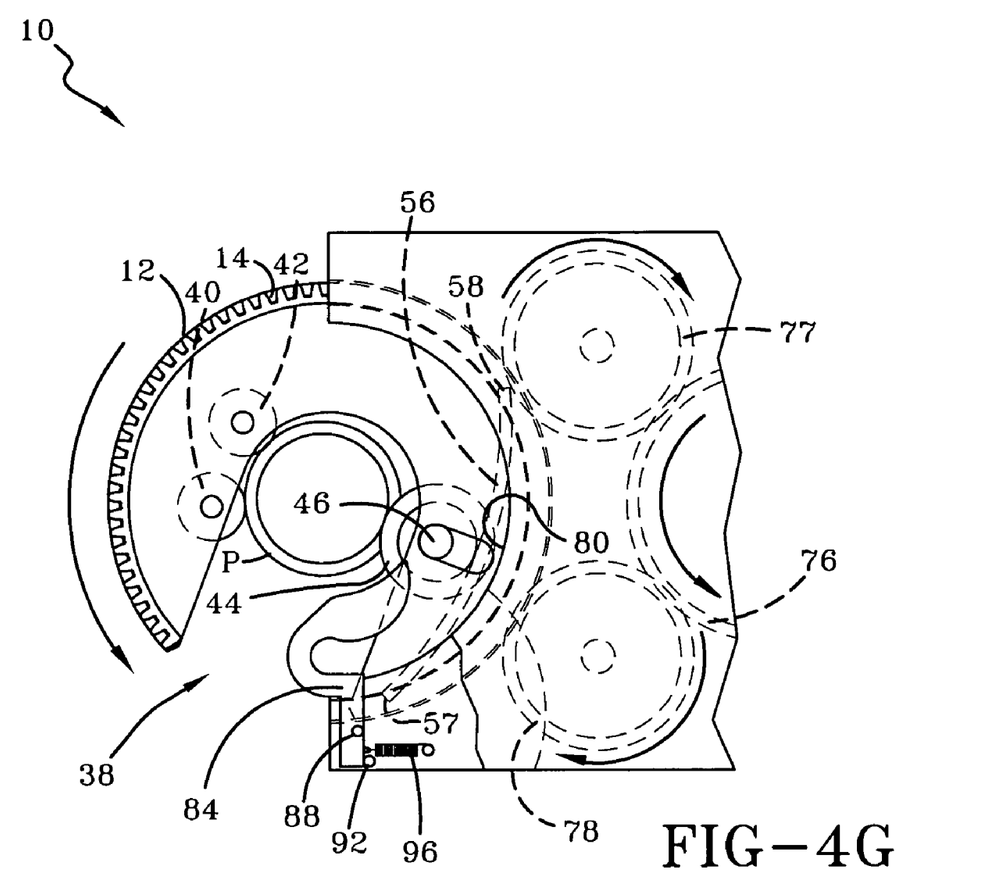
Figure 5:
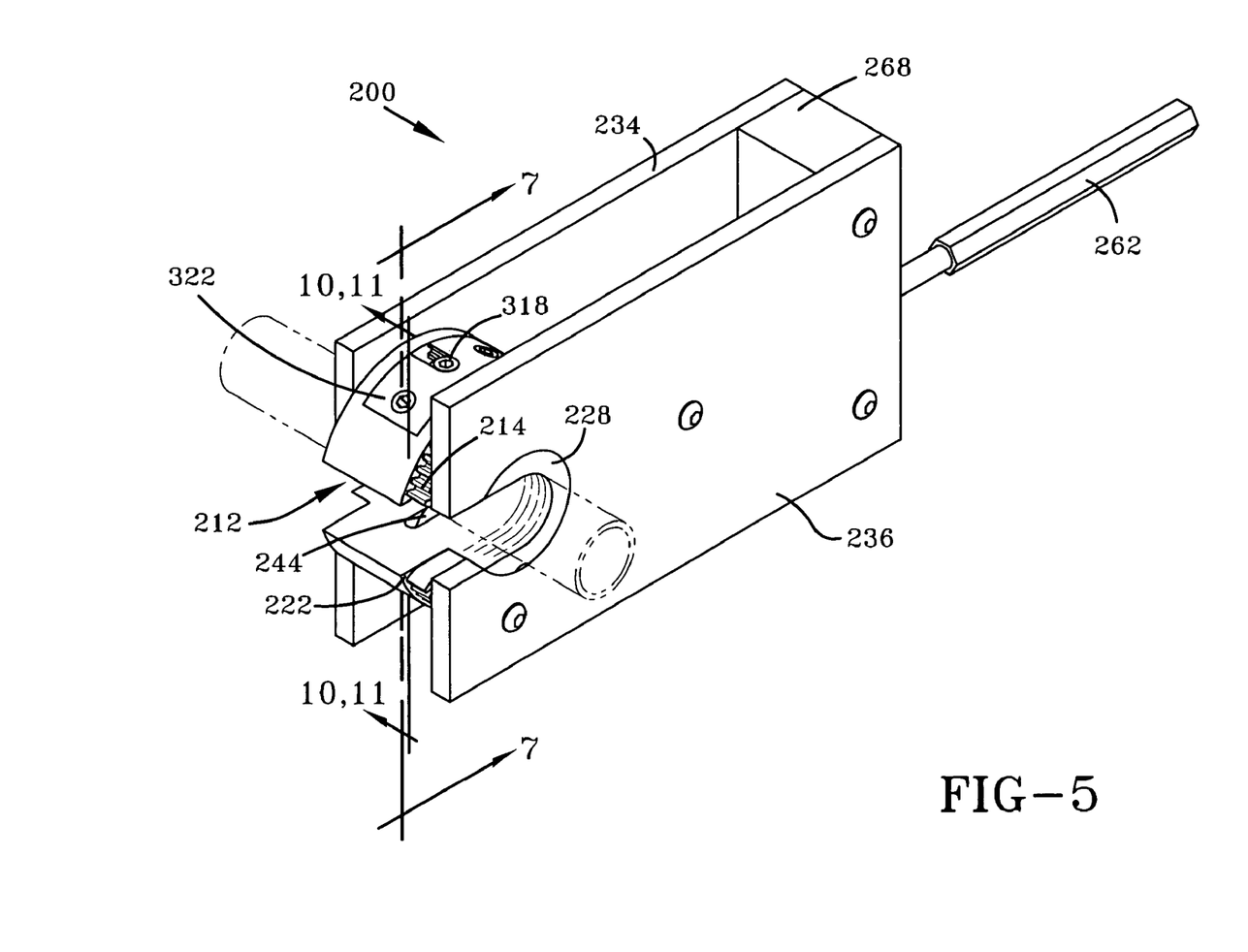
FIG. 5 is a perspective view of a second embodiment of a pipe cutter according to this invention.

As seen in FIG. 4C, once rotary head 12 is placed over a pipe P, rotary head 12 is rotated in the counterclockwise direction. When freewheeling shaft 46 is no longer retained by hooks 82, 84, the biasing force of plate spring member 56 pushes cutting wheel 44 against pipe P and effectively clamps pipe P between support rollers 40, 42 and cutting wheel 44 (FIGS. 4D–G). For purposes herein, the contact between pipe P and support rollers 40, 42 and cutting wheel 44 defines a "pipe cradle," the actual dimensions of which will vary with different pipe sizes. As rotary head 12 continues to be rotated in the counterclockwise direction, cutting wheel 44 creates a groove in pipe P by pushing pipe material to the side or inward (or both) toward the center of pipe P. The depth of this groove incrementally increases during continued rotation, due to the biasing force exerted on cutting wheel 44 by plate spring member 56. This incremental cutting action is represented in FIGS. 4D–G. Hooks 82, 84 do not interfere with the counterclockwise rotation of rotary head 12 because they freely pivot on pivot pins 86, 88 (FIGS. 4E and 4F). To ensure that hooks 82, 84 are always oriented for receipt of freewheeling shaft 46 spring members 94, 96 are fixed to hooks 82, 84 at a position below pivot pins 86, 88.

A second embodiment of this invention is disclosed with reference to FIGS. 5–11 and is designated generally by the numeral 200. Pipe cutter 200 includes rotary head 212, with housing gear 214 fixed thereto to be coaxial with the axis of rotation of rotary head 212. In this embodiment, housing gear 214 could alternatively be formed directly into rotary head 212, as in the prior embodiment. In the embodiment shown, housing gear 214 lies flush with side wall 222 of rotary head 212, and fits over coaxial hub 228. Rotary head 212 and housing gear 214 are assembled to reside between housing members 234, 236, with side wall 20 lying flush with housing member 234 and housing gear 214 residing substantially flush between side wall 222 and housing member 236. Because housing members 234 and 236 are fixed together by being secured to housing member 268 (by appropriate fasteners) coaxial hubs 226, 228 are retained in recess 280 formed in housing members 234, 236, and rotary head 212 can rotate about its axis of rotation.

Figure 6:
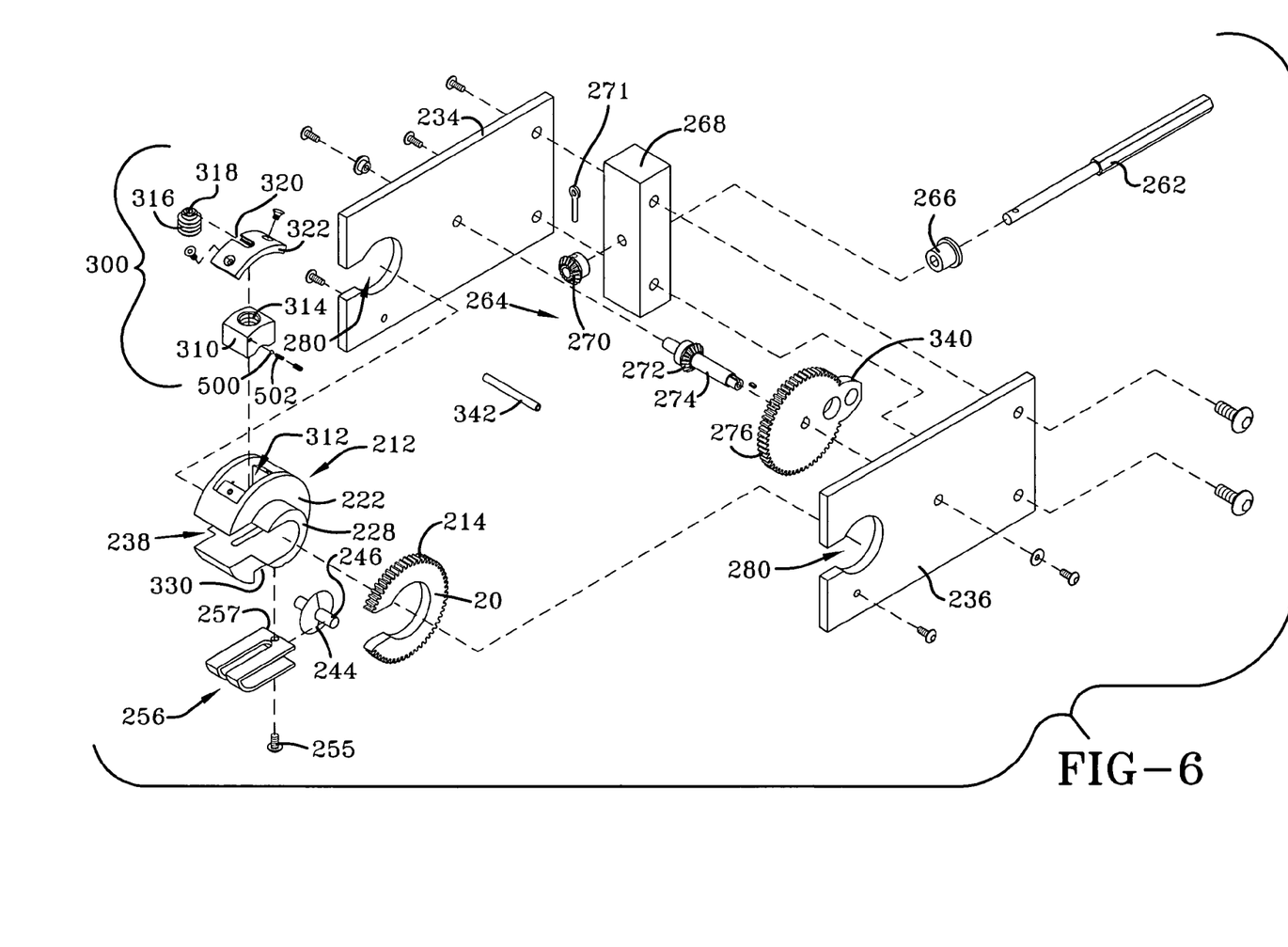
FIG. 6 is an assembly diagram of the second embodiment.
Figure 7:
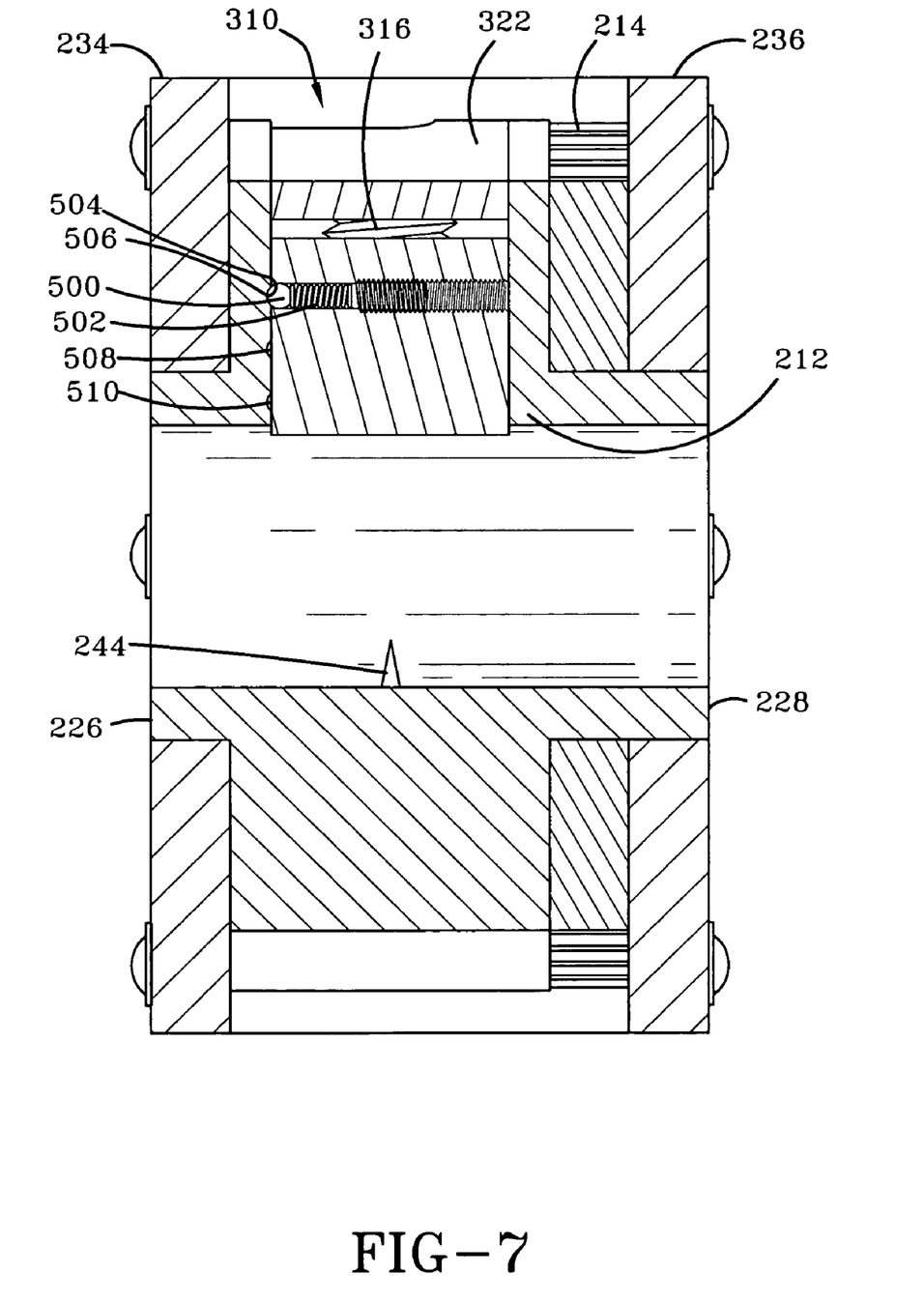
FIG. 7 is a cross sectional view taken along the line 7—7 in FIG. 5.
Figure 8:
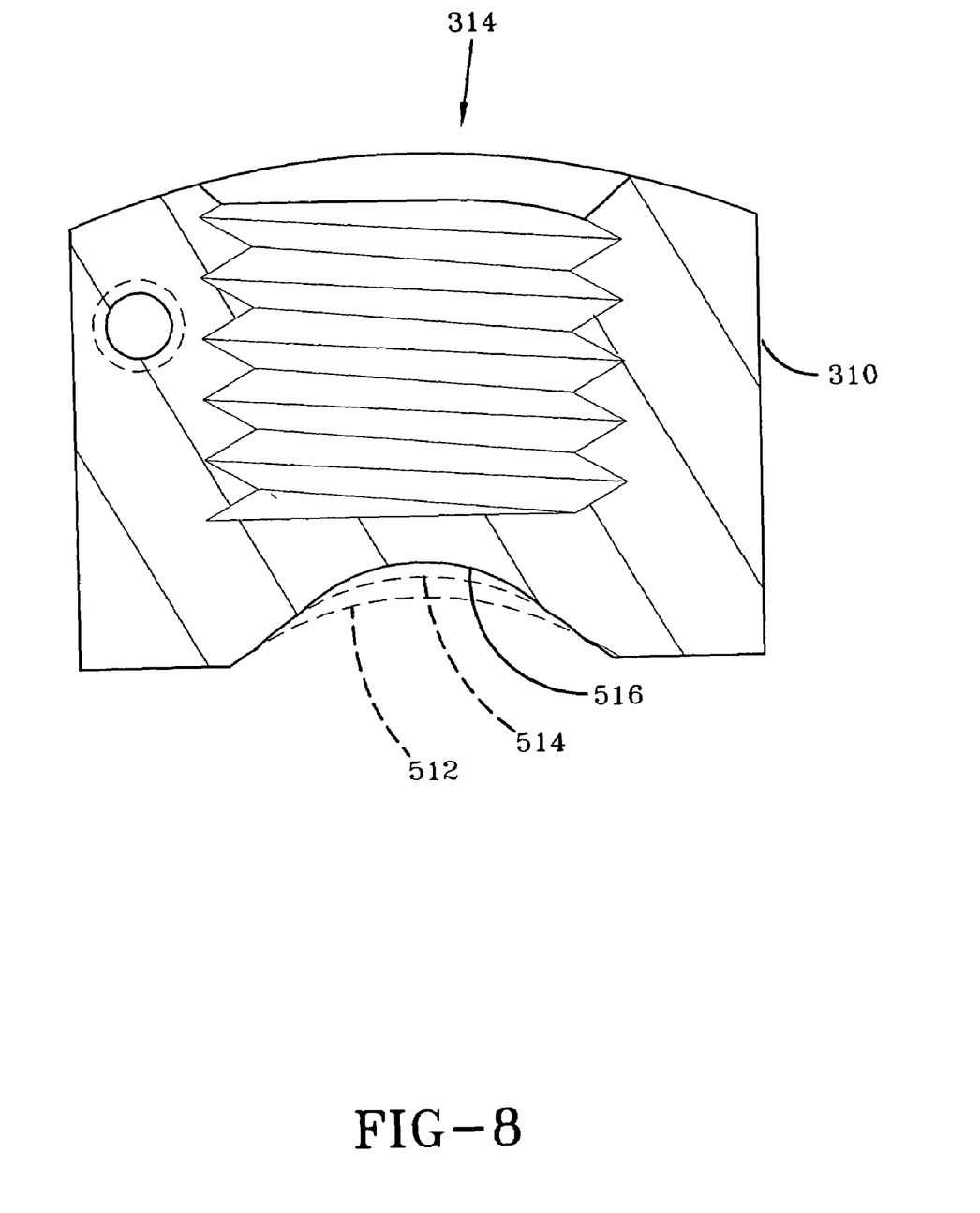
FIG. 8 is an exploded view of the adjustable block of the second embodiment.

Pipe slot 238 extends into rotary head 212 (and hubs 226, 228) and housing gear 214 so that rotary head 212 and housing gear 214 can be fitted around the pipe. Although freewheeling support rollers (such as those at 40, 42 of the first embodiment) could be provided, this embodiment demonstrates that support rollers are not necessary. Instead of providing support rollers to provide a pipe cradle, this embodiment employs a movable block assembly 300 in rotary head 212. Movable block assembly 300 includes a block 310 that is sized to extend within aperture 312 in rotary head 212. Block 310 is threaded at threaded aperture 314, and threaded aperture 314 receives an adjustment bolt 316 adjustment bolt 316 has a head portion 318 that mates with slot 320 in cover plate 322, which is fastened to rotary head 212 to fix the entire movable block assembly 300 therein. When adjustment bolt 316 is rotated in the clockwise or counterclockwise direction, block 310 is caused to move radially inwardly or outwardly, according to the pitch of the threads on adjustment bolt 316 and threaded aperture 314. More particularly, block 310 may be caused to extend into pipe slot 238 to a desired degree. Block 310 thus forms a portion of the pipe cradle of this embodiment, with the remainder of the pipe cradle being formed by cutting wheel 244, which extends into pipe slot 238 under a biasing force. It is preferred that block 310 be formed of a low friction metal, such as brass.

As already mentioned, it is important that the longitudinal axis of the pipe be coaxial with the axis of rotation of rotary head 12, and it should be appreciated that block 310 helps to ensure that the pipe is cradled in this manner, despite the size of the pipe. That is, block 310 may be moved to provide an appropriately positioned pipe cradle for various pipe sizes. The most common pipe diameters are 1 inch, ¾ inch, and ½ inch pipe, and, in a particularly preferred embodiment, block 310 includes registration means that help one to position block 310 in an appropriate position for cutting these sizes of pipe. In the cross section of FIG. 7, it is seen that block 310 includes set bearing 500 that is biased by spring 502 against internal surface 504 of rotary head 212. Surface 504 includes 1 inch set groove 506, ¾ inch set groove 508, and ½ inch set groove 510. As block 310 is moved through adjustment bolt 316, set bearing 500 will settle into any groove 506, 508, 510 it encounters, and, as their names imply, these grooves are set such that, when set bearing 500 engages 1 inch pipe groove 506, block 310 extends into pipe slot 238 to receive a 1 inch pipe coaxially with rotary head 212, when set bearing 500 engages ¾ inch pipe groove 508, block 310 extends into pipe slot 308 to receive a ¾ pipe coaxially with rotary head 212, and, when set bearing 500 engages ½ inch pipe groove 510, block 310 extends into pipe slot 238 to receive a ½ inch pipe coaxially with rotary head 212. Although this preferred embodiment focuses upon 1 inch, ¾ inch and ½ inch pipes, the adjustable block concept is not limited thereto or thereby. Additionally, it should be appreciated that block 310 could be provided with rollers rather than pipe grooves 512, 514, and 516, discussed below.

Referring now to FIG. 8, it will be seen that block 310 preferably includes 1 inch pipe groove 512, ¾ inch pipe groove 514, and ½ inch pipe groove 516. As their names imply, 1 inch pipe groove 512 is provided to intimately contact a 1 inch pipe placed in pipe slot 238, ¾ inch pipe groove 514 is sized to intimately contact a ¾ inch pipe placed in pipe groove 238, and ½ inch pipe groove 516 is positioned to intimately contact ½ inch pipe placed in a slot 238, when set bearing 500 is positioned in the appropriate set groove 506, 508, 510.

Figure 10:
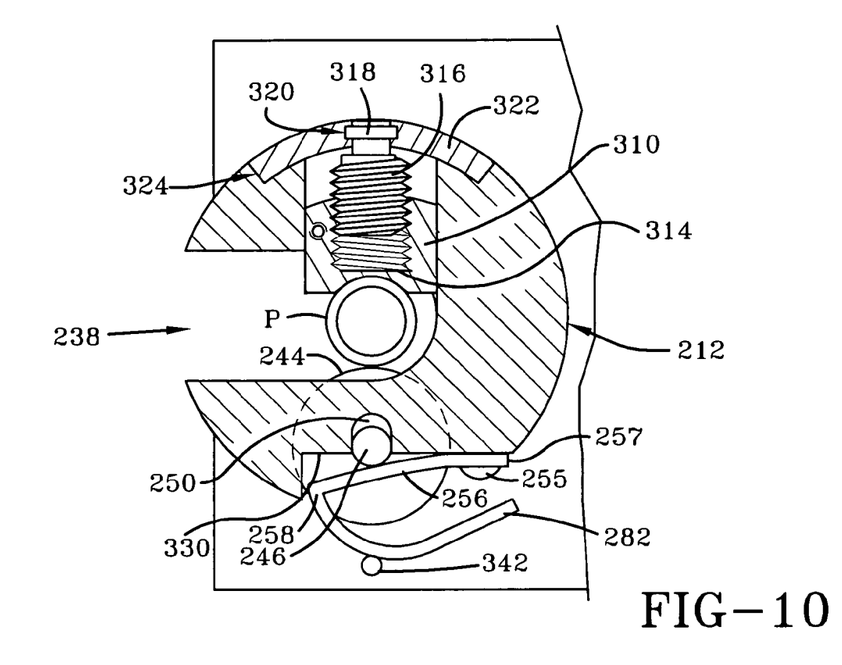
FIG. 10 is a side cross-sectional view of the rotary head of the second embodiment.

The biasing force is provided by plate spring member 256, which is fixed to the exterior of rotary head 212 by fastener 255 positioned proximate edge 257 of plate spring 256. Plate spring member 256 extends flush with recessed wall 330 of rotary head 212 and retains freewheeling shaft 246 of cutting wheel 244 within wheel slot 250 to urge cutting wheel 244 to extend into pipe slot 238. If freewheeling shaft 246 is urged radially outwardly in wheel slot 250, plate spring member 256 will bow radially outwardly while still providing a biasing force on shaft 246 in a radially inwardly direction. As with the other embodiment, it is this biasing force that presses cutting wheel 244 against a pipe once a pipe is placed in the pipe cradle formed by block 310 and cutting wheel 244. Rotary head 212, through housing gear 214, is caused to rotate such that cutting wheel 244 revolves around the pipe, and the biasing force placed on cutting wheel 244 causes cutting wheel 244 to cut through the pipe.

Figure 9A:
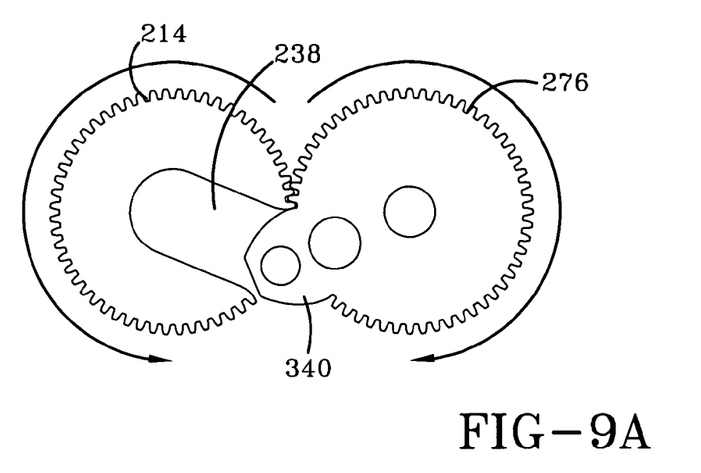
FIGS. 9A through 9C depict the operation of the slot-engaging gear of the second embodiment.
Figure 9B:
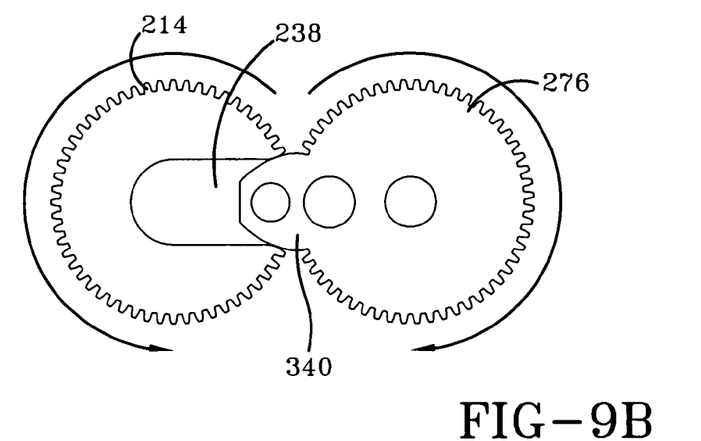
Figure 9C:
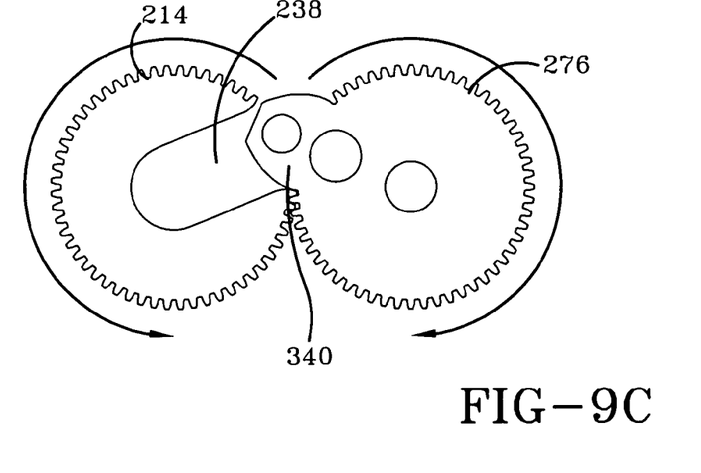

In order to rotate rotary head 212 about its axis of rotation, drive shaft 262 is operatively connected to housing gear 214 through a gear system that is generally designated by the numeral 264. Drive shaft 262 extends through bushing 266 and housing member 268, and is secured to beveled gear 270 by pin 271. Beveled gear 270 is keyed to beveled gear 272, which extends from shaft 274 secured between housing members 234, 236 by appropriate fasteners. In this embodiment, multiple gears are not employed around housing gear 214, rather, a slot-engaging gear 276 is secured to shaft 274 to rotate therewith, and is keyed to housing gear 214. Referring now to FIGS. 9A–C it can be seen that slot-engaging gear 276 is keyed to housing gear 214 and sized such that one rotation of slot-engaging gear 276 results in one rotation of housing gear 214. Slot-engaging gear 276 includes protrusion 340, which engages a portion of pipe slot 238 once during each rotation of slot-engaging gear 276 and housing gear 214. That is, by providing protrusion 340, slot-engaging gear 276 may drive housing gear 214 and rotary head 212 despite the gap in housing gear 214 that is created by pipe slot 238.

Figure 11:
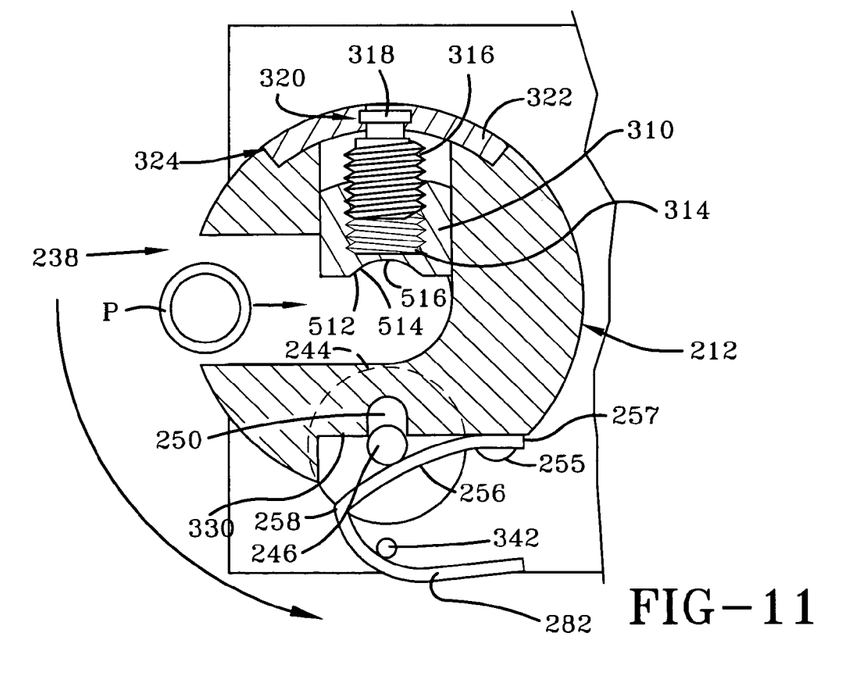
FIG. 11 is a side cross-sectional view of the rotary head, showing the retraction of the cutting wheel from the pipe slot.

Before driving gear system 264 to rotate rotary head 212, pipe slot 238 is aligned to extend outside of housing members 234, 236, and is fit over a pipe P. Reference is now made to FIG. 11, which is a cross-sectional view taken generally along the line 11—11 in FIG. 5, although, in FIG. 11, cutting wheel 244 is retracted from pipe slot 238. Retraction hook 282 extends from edge 258 of plate spring member 256, and, during counterclockwise rotation of rotary head 212 (in the orientation shown) hooks onto retraction rod 342, which extends between housing members 234, 236. Once hooked, further counterclockwise rotation of rotary head 212 will cause plate spring member 256 to be pulled away from its flush engagement with recess 330, and cutting wheel 244 will move radially outwardly to provide more room in pipe slot 238 for a pipe P. Additionally, rotation of rotary head 212 will be impeded, with pipe slot 238 being aligned so as to be able to fitted over pipe P.

When rotary head 212 is placed over pipe P, rotary head 212 is rotated in the clockwise direction, and retraction hook 282 disengages retraction rod 342 such that plate spring member 256 forces cutting wheel 224 against pipe P. For purposes herein, the contact between pipe P and block 310 and cutting wheel 244 defines a "pipe cradle," the actual dimensions of which will vary with different pipe sizes. As mentioned, adjustment bolt 318, which moves block 310 radially inwardly or outwardly may be adjusted as needed for different sizes of pipe. As rotary head 212 continues to be rotated in the clockwise direction, cutting wheel 244 creates a groove in pipe P by pushing pipe material to the side or inward (or both) toward the center of pipe P. The depth of this groove incrementally increases during continued rotation, due to the biasing force exerted on cutting wheel 244 by plate spring member 256.

Figure 12:
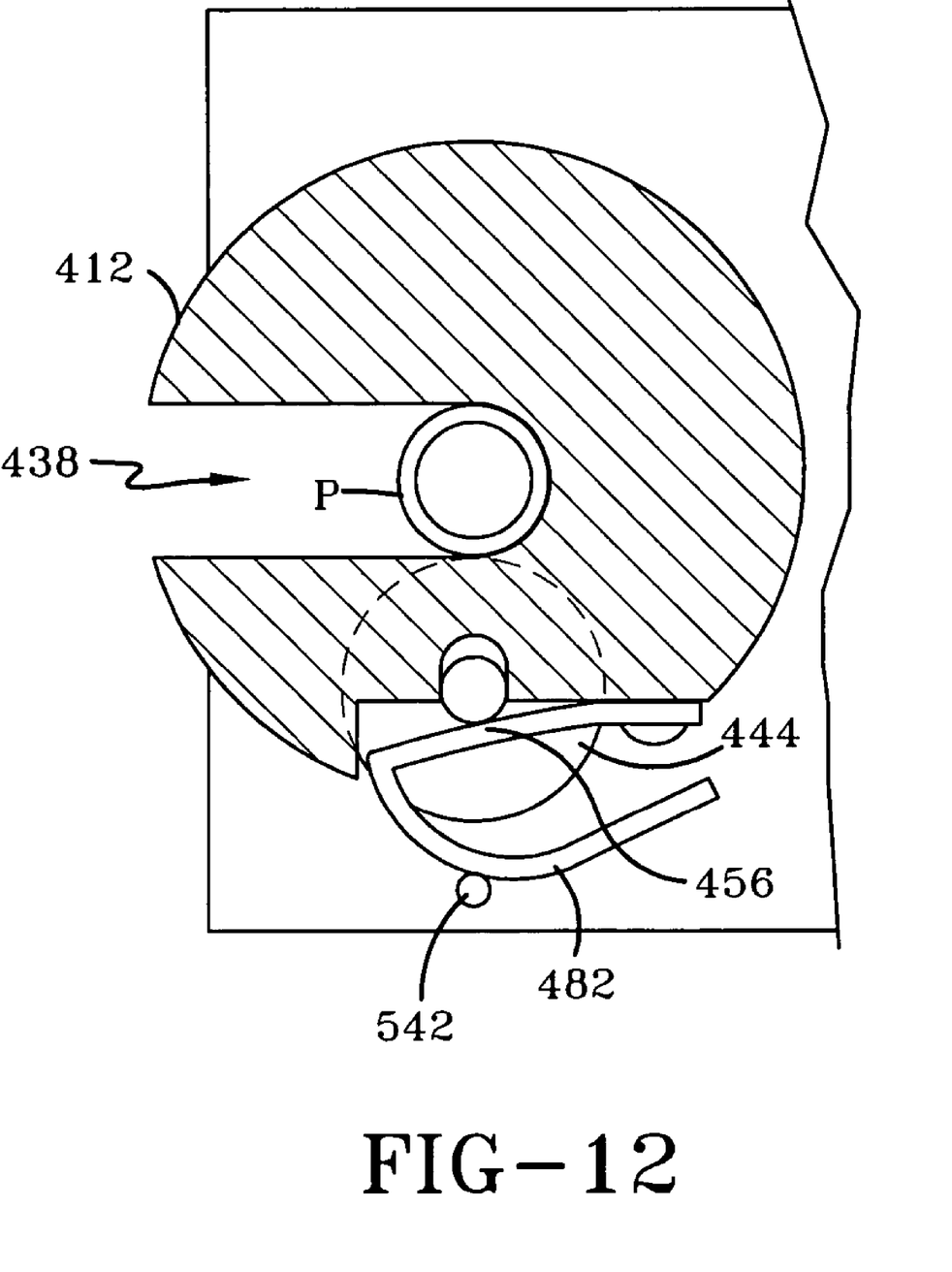
FIG. 12 is a side plan view of an alternative embodiment of a rotary head for a pipe cutter according to this invention.

Referring again to the "pipe cradle" created by block 310 and cutting wheel 244, it should be appreciated that, for purposes herein, block 310, in its broadest interpretation, is considered to be a "movable wall" of pipe slot 238. In an alternative design for rotary heads 12, 212, neither rollers 40, 42 nor block 310 need be employed. Rather, it is envisioned that a plurality of rotary heads could be provided to be selectively and individually engaged with the driving gear systems, and each of the plurality of rotary heads could provide a pipe slot that is sized to receive a pipe of a different diameter. In such an embodiment, rollers might still be provided in the pipe slot to help form the pipe cradle; however, the pipe slot could simply intimately receive the desired pipe size with the intimate fitting (along with contact with cutting wheel 44) being considered a pipe cradle. This is shown generally in FIG. 12, wherein an alternative rotary head 412 is shown providing a pipe slot 438 that defines a pipe cradle between cutting wheel 444 and the opposed wall of pipe slot 438. Cutting wheel 444 is biased by plate spring member 456, which includes retraction hook 482, working in conjunction with retraction rod 542. In such an embodiment, it is preferred that rotary head 412 be formed of a low friction metal, such as brass. Actually, the entire rotary head 412 need not be formed from such a metal, rather, it is preferred that at least the portion of pipe slot 238 that cradles the pipe be formed of such a metal or other low-friction material. This general concept could also be applied in the embodiment of FIGS. 1–4.

In light of the foregoing, it should be evident that the pipe cutters and methods of invention substantially improve the art. The invention is particularly suited for cutting metal pipes, but is not necessarily limited thereto, and it should be appreciated that the use herein of the term "pipe" should be understood to include other similar cylindrical elements, such as plastic or rubber conduit, flexible conduits (which might typically be of ribbed profile), and solid bar pipe. While, in accordance with the patent statutes, only the preferred embodiments of the present invention have been described in detail hereinabove, the present invention is not limited thereto or thereby. In particular, drive systems according to the present invention are not necessarily limited to those having slot-engaging gears, as in the second embodiment, or a prime gear and first and second drive gears, as in the first embodiment. Additionally, such drive systems may be interchanged between the different embodiments. Also, the means for providing a pipe cradle need not be limited to those disclosed above, and the means for providing a pipe cradle shown in one embodiment might be incorporated into another embodiment. For instance, it is envisioned that rollers could be provided on an adjustable block to extend inwardly into the pipe slot to a greater or lesser degree for varying sizes of pipe. Moreover, as noted above, various means for driving the drive shaft may be provided. These might include manual rachet-type driving of the drive shaft or automated driving of the drive shaft by a rotary source such as a motorized drill. Thus, the scope of the invention shall include all modifications and variations that may fall within the scope of the attached claims.

The invention claimed is:

1. A pipe cutter comprising:
   a rotary head having an axis of rotation;
   a housing gear having teeth and being coaxial with said rotary head portion, such that said housing gear and said rotary head portion have a common axis of rotation;
   a pipe slot extending into said rotary head portion and said housing gear;
   a pipe cradle within said pipe slot for receiving a pipe;
   a cutting wheel associated with said rotary head portion; and
   a slot-engaging gear having teeth keyed to said teeth of said housing gear, said slot-engaging gear being sized such that one rotation of said slot-engaging gear results in one rotation of said housing gear, said slot-engaging gear including a protrusion that extends beyond said teeth of said slot-engaging gear and engages a portion of said pipe slot once during each rotation of said slot-engaging gear and housing gear.

2. A pipe cutter comprising:
a rotary head having an axis of rotation;
a housing gear coaxial with said rotary head, such that said housing gear and said rotary head have a common axis of rotation;
a pipe slot extending into said rotary head and said housing gear;
a pipe cradle within said pipe slot for receiving a pipe;
a cutting wheel associated with said rotary head to revolve about the axis of rotation of said rotary head when said rotary head is driven about its axis of rotation;
a primary drive source operatively connected to said housing gear to rotate said housing gear and rotary head about their common axis of rotation, wherein said housing gear has teeth and said primary drive source is operatively connected to said housing gear through a gear system including a slot-engaging gear having teeth keyed to said teeth of said housing gear, said slot-engaging gear being sized such that one rotation of said slot-engaging gear results in one rotation of said housing gear, said slot-engaging gear including a protrusion that extends beyond said teeth of said slot-engaging gear and engages a portion of said pipe slot once during each rotation of said slot-engaging gear and housing gear; and
a spring member predisposing said cutting wheel to extend into said pipe slot absent a counter force acting against said spring member, such that, when a pipe is placed into said pipe slot and said rotary head is rotated about its axis of rotation, said spring member forces said cutting wheel against the pipe so that said cutting wheel cuts the pipe as it revolves about the axis of rotation of said rotary head.

3. The pipe cutter of claim 2, wherein said pipe cradle includes at least two freewheeling support rollers that extend into said pipe slot.

4. The pipe cutter of claim 3, wherein said pipe cradle includes an adjustable block that may be selectively set at varying positions within said pipe slot.

5. The pipe cutter of claim 4, wherein said adjustable block includes a plurality of pipe-engaging surfaces.

6. A pipe cutter comprising:
a rotary head having an axis of rotation and a substantially radially extending wheel slot;
a housing gear coaxial with said rotary head, such that said housing gear and said rotary head have a common axis of rotation;
a pipe slot extending into said rotary head and said housing gear;
a pipe cradle within said pipe slot for receiving a pipe;
a cutting wheel extending from a shaft retained within said wheel slot of said rotary head, said cutting wheel and shaft revolving about the axis of rotation of said rotary head when said rotary head is driven about its axis of rotation;
a plate spring member having a slot therein for receiving a portion of said cutting wheel, said plate spring member contacting said shaft to urge said shaft radially inwardly in said wheel slot absent a counter force acting against said plate spring member, such that, when a pipe is placed into said pipe slot and said rotary head is rotated about its axis of rotation in a cutting direction, said plate spring member forces said cutting wheel against the pipe so that said cutting wheel cuts the pipe as it revolves about the axis of rotation of said rotary head; and
a retraction hook that selectively engages said shaft during rotation of said rotary head in a retracting direction and, during rotation of said cutting wheel in said cutting direction, ratchets about a pivot pin.

7. The pipe cutter of claim 6, wherein, when said retraction hook engages said shaft, continued rotation of said rotary head in said retracting direction causes said shaft to be urged radially outwardly in said wheel slot.

8. A pipe cutter comprising:
a rotary head having an axis of rotation and a substantially radially extending wheel slot;
a housing gear coaxial with said rotary head, such that said housing gear and said rotary head have a common axis of rotation;
a pipe slot extending into said rotary head and said housing gear;
a pipe cradle within said pipe slot for receiving a pipe;
a cutting wheel extending from a shaft retained within said wheel slot of said rotary head, said cutting wheel and shaft revolving about the axis of rotation of said rotary head when said rotary head is driven about its axis of rotation;
a plate spring member having a slot therein for receiving a portion of said cutting wheel, wherein said rotary head provides an external plate spring surface, said wheel slot opens to said external plate spring surface, and said plate spring member is fixed to said rotary head to extend along said external plate spring surface in a manner that biases said plate spring in the direction of lying flush with said external plate spring surface said plate spring member contacting said shaft to urge said shaft radially inwardly in said wheel slot absent a counter force acting against said plate spring member, such that, when a pipe is placed into said pipe slot and said rotary head is rotated about its axis of rotation in a cutting direction, said plate spring member forces said cutting wheel against the pipe so that said cutting wheel cuts the pipe as it revolves about the axis of rotation of said rotary head;
a retraction plate extending from said plate spring member; and
a retraction rod that selectively engages said retraction plate during rotation of said rotary head in a retracting direction.

9. The pipe cutter of claim 8, wherein, when said retraction rod engages said retraction plate, continued rotation of said rotary head in said retracting direction causes said plate spring member to be urged away from lying flush with said external plate spring surface.

* * * * *